(12) United States Patent
Newcombe et al.

(10) Patent No.: US 8,401,242 B2
(45) Date of Patent: Mar. 19, 2013

(54) REAL-TIME CAMERA TRACKING USING DEPTH MAPS

(75) Inventors: Richard Newcombe, Nuneaton (GB); Shahram Izadi, Cambridge (GB); David Molyneaux, Oldham (GB); Otmar Hilliges, Cambridge (GB); David Kim, Cambridge (GB); Jamie Daniel Joseph Shotton, Cambridge (GB); Pushmeet Kohli, Cambridge (GB); Andrew Fitzgibbon, Cambridge (GB); Stephen Edward Hodges, Cambridge (GB); David Alexander Butler, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 233 days.

(21) Appl. No.: 13/017,587

(22) Filed: Jan. 31, 2011

(65) Prior Publication Data

US 2012/0196679 A1   Aug. 2, 2012

(51) Int. Cl.
*G06K 9/00* (2006.01)
(52) U.S. Cl. ....................................................... 382/107
(58) Field of Classification Search .......... 382/100–107; 73/488–490; 348/154–156; 356/27–30
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

U.S. Appl. No. 12/367,665, filed Feb. 9, 2009, "Camera Based Motion Sensing System".

(Continued)

*Primary Examiner* — Atiba O Fitzpatrick
(74) *Attorney, Agent, or Firm* — Zete Law, P.L.L.C.; MacLane C. Key

(57) ABSTRACT

Real-time camera tracking using depth maps is described. In an embodiment depth map frames are captured by a mobile depth camera at over 20 frames per second and used to dynamically update in real-time a set of registration parameters which specify how the mobile depth camera has moved. In examples the real-time camera tracking output is used for computer game applications and robotics. In an example, an iterative closest point process is used with projective data association and a point-to-plane error metric in order to compute the updated registration parameters. In an example, a graphics processing unit (GPU) implementation is used to optimize the error metric in real-time. In some embodiments, a dense 3D model of the mobile camera environment is used.

20 Claims, 10 Drawing Sheets

U.S. PATENT DOCUMENTS

| | | |
|---|---|---|
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,696,591 A | 12/1997 | Bilhorn et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,504,569 B1 | 1/2003 | Jasinschi et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,940,538 B2 | 9/2005 | Rafey et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,135,992 B2 | 11/2006 | Karlsson et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,366,325 B2 | 4/2008 | Fujimura et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,697,748 B2 | 4/2010 | Dimsdale et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |

| | | | |
|---|---|---|---|
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2003/0067461 | A1 | 4/2003 | Fletcher et al. |
| 2004/0075738 | A1 | 4/2004 | Burke et al. |
| 2004/0167667 | A1 | 8/2004 | Goncalves et al. |
| 2004/0233287 | A1 | 11/2004 | Schnell |
| 2005/0238200 | A1 | 10/2005 | Gupta et al. |
| 2006/0221250 | A1 | 10/2006 | Rossbach et al. |
| 2007/0052807 | A1 | 3/2007 | Zhou et al. |
| 2007/0116356 | A1 | 5/2007 | Gong et al. |
| 2007/0156286 | A1 | 7/2007 | Yamauchi |
| 2008/0026838 | A1 | 1/2008 | Dunstan et al. |
| 2008/0060854 | A1 | 3/2008 | Perlin |
| 2008/0152191 | A1 | 6/2008 | Fujimura et al. |
| 2008/0304707 | A1 | 12/2008 | Oi et al. |
| 2010/0085352 | A1 | 4/2010 | Zhou et al. |
| 2010/0085353 | A1 | 4/2010 | Zhou et al. |
| 2010/0094460 | A1 | 4/2010 | Choi et al. |
| 2010/0103196 | A1 | 4/2010 | Kumar et al. |
| 2010/0111370 | A1 | 5/2010 | Black et al. |
| 2010/0278384 | A1 | 11/2010 | Shotton et al. |
| 2010/0281432 | A1 | 11/2010 | Geisner et al. |
| 2010/0302395 | A1 | 12/2010 | Mathe et al. |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

U.S. Appl. No. 12/790,026, filed May 28, 2010, "Foreground and Background Image Segmentation".

U.S. Appl. No. 12/877,595, filed Sep. 8, 2010, "Depth Camera Based on Structured Light and Stereo Vision".

Baltzakis, et al., "Tracking of human hands and faces through probabilistic fusion of multiple visual cues", retrieved on Nov. 28, 2010 at <<http://citeseerx.ist.psu.edu/viewdoc/download?doi=10.1.1.158.8443&rep=rep1&type=pdf>>, IEEE, Intl Conference on Computer Vision Systems (ICVS), Santorini, Greece, May 2008, pp. 1-10.

Benko, et al., "DepthTouch: Using Depth-Sensing Camera to Enable Freehand Interactions on and Above the Interactive Surface", retrieved on Nov. 28, 2010 at <<http://research.microsoft.com/en-us/um/people/benko/publications/2008/DepthTouch_poster.pdf>>, IEEE Tabletops and Interactive Surfaces, Amsterdam, the Netherlands, Oct. 2008, pp. 1.

Besl, et al., "A Method for Registration of 3-D Shapes", IEEE Transactions on Pattern Analysis and Machine Intelligence, vol. 14, No. 2, Feb. 1992, pp. 239-256.

Blais, et al., "Registering Multiview Range Data to Create 3D Computer Objects", IEEE Transactions on Pattern Analysis and Machine Intelligence, vol. 17, No. 8, Aug. 1995, pp. 820-824.

Boehnke, "Fast Object Localization with Real Time 3D Laser Range Sensor Simulation", retrieved on Nov. 24, 2010 at <<http://www.wseas.us/e-library/transactions/electronics/2008/Paper%204%20BOEHNKE.pdf>>, WSEAS Transactions on Electronics, vol. 5, No. 3, Mar. 2008, pp. 83-92.

Bolitho, et al., "Parallel Poisson Surface Reconstruction", retrieved on Nov. 29, 2010 at <<http://www.cs.jhu.edu/~misha/MyPapers/ISVC09.pdf>>, Springer-Verlag Berlin, Proceedings of Intl Symposium on Advances in Visual Computing: Part I (ISVC), Nov. 2010, pp. 678-689.

Bolitho, "The Reconstruction of Large Three-dimensional Meshes", retrieved on Nov. 29, 2010 at <<http://www.cs.jhu.edu/~misha/Bolitho/Thesis.pdf>>, Johns Hopkins University, PhD Dissertation, Mar. 2010, pp. 1-171.

Botterill, et al., "Bag-of-Words-driven Single Camera SLAM", retrieved on Nov. 26, 2010 at <<http://www.hilandtom.com/tombotterill/Botterill-Mills-Green-2010-BoWSLAM.pdf>>, Journal on Image and Video Processing, Aug. 2010, pp. 1-18.

Broll, et al., "Toward Next-Gen Mobile AR Games", retrieved on Nov. 24, 2010 at <<http://ieeexplore.ieee.org/stamp/stamp.jsp?tp=&arnumber=4557954>>, IEEE Computer Society, IEEE Computer Graphics and Applications, vol. 28, No. 4, 2008, pp. 40-48.

Campbell, et al., "Automatic 3D Object Segmentation in Multiple Views using Volumetric Graph-Cuts", Butterworth-Heinemann, Newton, MA, Image and Vision Computing, vol. 28, No. 1, Jan. 2010, pp. 14-25.

Carmody, "How Motion Detection Works in Xbox Kinect", retrieved on Nov. 29, 2010 at <<http://gizmodo.com/5681078/how-motion-detection-works-in-xbox-kinect>>, Gizmo.com. Nov. 3, 2010, pp. 1-4.

Chen, et al., "Object Modeling by Registration of Multiple Range Images", IEEE Proceedings of Intl Conference on Robotics and Automation, Sacramento, California, Apr. 1991, pp. 2724-2729.

Cheung, et al., "Robust Background Subtraction with Foreground Validation for Urban Traffic Video", retrieved on Nov. 28, 2010 at <<http://downloads.hindawi.com/journals/asp/2005/726261.pdf>>, Hindawi Publishing, EURASIP Journal on Applied Signal Processing, vol. 14, 2005, pp. 2330-2340.

Cohen, et al., "Interactive Fluid-Particle Simulation using Translating Eulerian Grids", ACM SIGGRAPH, Proceedings of Symposium on Interactive 3D Graphics and Games (I3D), 2010, pp. 15-22.

Curless, et al., "A Volumetric Method for Building Complex Models from Range Images", ACM SIGGRAPH, Proceedings of Conference on Computer Graphics and Interactive Techniques, New Orleans, LA, Aug. 1996, pp. 303-312.

Cutts, "Matt Cutts: Gadgets, Google, and SEO", retrieved on Nov. 30, 2010 at <<http://www.mattcutts.com/blog/>> Google/SEO, Nov. 2010, 10 pages.

Davison, et al., "Mobile Robot Localisation using Active Vision", Springer, LNCS vol. 1407, No. II, Proceedings of European Conference on Computer Vision, Freiburg, Germany, 1998, pp. 809-825.

de la Escalera, et al., "Automatic Chessboard Detection for Intrinsic and Extrinsic Camera Parameter Calibration", retrieved on Nov. 29, 2010 at <<http://www.mdpi.com/1424-8220/10/3/2027/pdf>>, Sensors, vol. 10, No. 3, 2010, pp. 2027-2044.

Elfes, et al., "Sensor Integration for Robot Navigation: Combining Sonar and Stereo Range Data in a Grid-Based Representation", IEEE, Proceedings of Conference on Decision and Control, Los Angeles, California, Dec. 1987, pp. 1802-1807.

Frahm, et al., "Building Rome on a Cloudless Day", Springer-Verlag Berlin, Proceedings of European Conference on Computer Vision: Part IV (ECCV), 2010, pp. 368-381.

Fujii, et al., "Three-dimensional finger tracking using direct and reflected infrared images", retrieved on Nov. 29, 2010 at <<http://www.acm.org/uist/archive/adjunct/2002/pdf/posters/p27-fujii.pdf>>, ACM, Symposium on User Interface Software and Technology (UIST), Paris, France, Oct. 2002, pp. 27-28.

Furukawa, et al., "Towards Internet-scale Multi-view Stereo", IEEE Computer Society, Proceedings of Conference on Computer Vision and Pattern Recognition (CVPR), San Francisco, California, Jun. 2010, pp. 1434-1441.

Goesele, et al., "Multi-View Stereo Revisited", IEEE Computer Society, Proceedings of Conference on Computer Vision and Pattern Recognition (CVPR), New York, NY, vol. 2, 2006, pp. 2402-2409.

Hadwiger, et al., "Advanced Illumination Techniques for GPU-Based Volume Raycasting", ACM SIGGRAPH, Intl Conference on Computer Graphics and Interactive Techniques, 2009, pp. 1-56.

Harada, "Real-Time Rigid Body Simulation on GPUs", retrieved on Apr. 18, 2011 at <<http.developer.nvidia.com/GPUGems3/gpugems3_ch29.html>>, Nvidia, GPU Gems 3, Chapter 29, 2008, pp. 1-21.

Henry, et al., "RGB-D Mapping: Using Depth Cameras for Dense 3D Modeling of Indoor Environments", ISER, 2010, pp. 1-2.

Herath, et al., "Simultaneous Localisation and Mapping: A Stereo Vision Based Approach", retrieved on Nov. 26, 2010 at <<http://ieeexplore.ieee.org/stamp/stamp.jsp?tp=&arnumber=4058480>>, IEEE, Intl Conference on Intelligent Robots and Systems, Beijing, China, Oct. 2006, pp. 922-927.

Hirsch, et al., "BiDi Screen: A Thin, Depth-Sensing LCD for 3D Interaction using Light Fields", retrieved on Nov. 29, 2010 at <<http://src.acm.org/2010/MatthewHirsch/BiDiScreen/BiDi%20Screen.htm>>, ACM SIGGRAPH Asia, Transactions on Graphics (TOG), vol. 28, No. 5, Dec. 2009, pp. 1-7.

Hogue, et al., "Underwater environment reconstruction using stereo and inertial data", retrieved on Nov. 29, 2010 at <<http://ieeexplore.ieee.org/stamp/stamp.jsp?arnumber=04413666>>, IEEE Intl Conference on Systems, Man and Cybernetics, Montreal, Canada, Jan. 2008, pp. 2372-2377.

Jivet, et al., "Real Time Representation of 3D Sensor Depth Images", retrieved on Nov. 28, 2010 at <<http://www.wseas.us/e-library/transactions/electronics/2008/Paper%202%20JIVET.pdf>>, WSEAS Transactions on Electronics, vol. 5, No. 3, Mar. 2008, pp. 65-71.

Kazhdan, et al., "Poisson Surface Reconstruction", Eurographics Symposium on Geometry Processing, 2006, pp. 61-70.

Kil, et al., "GPU-assisted Surface Reconstruction on Locally-Uniform Samples", retrieved on Nov. 29, 2010 at <<http://graphics.cs.ucdavis.edu/~yjkil/pub/psurface/Kil.PS. IMR08.pdf>>, Proceedings of Intl Meshing Roundtable, 2008, pp. 369-385.

Kim, et al., "Relocalization Using Virtual Keyframes for Online Environment Map Construction", retrieved on Nov. 26, 2010 at <<http://www.cs.ucsb.edu/~holl/pubs/Kim-2009-VRST.pdf>>, ACM, Proceedings of Symposium on Virtual Reality Software and Technology (VRST), Kyoto, Japan, Nov. 2009, pp. 127-134.

Klein, et al., "Parallel Tracking and Mapping for Small AR Workspaces", IEEE, Intl Symposium on Mixed and Augmented Reality, Nov. 2007, ISMAR, Nara, Japan, pp. 225-234.

Le Grand, "Broad-Phase Collision Detection with CUDA", retrieved on Apr. 2, 2011 at <<http:developer.nvidia.comIGPUGems3/gpugems3ch32.html>>, Nvidia, GPU Gems 3, Chapter 32, 2008, pp. 1-24.

Levoy, et al., "The Digital Michelangelo Project: 3D Scanning of Large Statues", ACM SIGGRAPH, New Orleans, LA, 2000, pp. 131-144.

Lorensen, et al., "Marching Cubes: A High Resolution 3D Surface Construction Algorithm", Computer Graphics, vol. 21, No. 4, Jul. 1987, pp. 163-169.

Michel, et al., "GPU-accelerated Real-Time 3D Tracking for Humanoid Locomotion and Stair Climbing", retrieved on Nov. 24, 2010 at <<http://ieeexplore.ieee.org/stamp/stamp.jsp?tp=&arnumber=4399104>>, IEEE, Proceedings of IEEE/RSJ Intl Conference on Intelligent Robots and Systems, San Diego, California, Nov. 2007, pp. 463-469.

Molchanov, et al., "Non-iterative Second-order Approximation of Signed Distance Functions for Any Isosurface Representation", retrieved on Nov. 29, 2010 at <<http://www.paul-rosenthal.de/wp-content/uploads/2010/06/molchanov_eurovis_2010.pdf>>, Blackwell Publishing, Eurographics/ IEEE-VGTC Symposium on Visualization, vol. 29, No. 3, 2010, pp. 1-10.

Newcombe, et al., "Live Dense Reconstruction with a Single Moving Camera", IEEE Computer Society, Proceedings of Conference on Computer Vision and Pattern Recognition (CVPR), 2010, pp. 1498-1505.

Osher, et al., "Level Set Methods and Dynamic Implicit Surfaces, Signed Distance Functions", Springer-Verlag New York, Applied Mathematical Sciences, Chapter 2, 2002, pp. 17-22.

Parker, et al., "Interactive Ray Tracing for Isosurface Rendering", IEEE Computer Society, Proceedings of Conference on Visualization (VIS), 1998, pp. 233-238 and 538.

Pollefeys, et al., "Detailed Real-Time Urban 3D Reconstruction From Video", Kluwer Academic Publishers, International Journal of Computer Vision, vol. 78, No. 2-3, Jul. 2008, pp. 143-167.

Purcell, et al., "Ray Tracing on Programmable Graphics Hardware", ACM Transactions on Graphics, vol. 1, No. 3, Jul. 2002, pp. 268-277.

Rusinkiewicz, et al., "Real-Time 3D Model Acquisition", ACM SIGGRAPH, Proceedings of Conference on Computer Graphics and Interactive Techniques, 2002, pp. 438-446.

Seitz, et al., "A Comparison and Evaluation of Multi-View Stereo Reconstruction Algorithms", IEEE Computer Society, Proceedings of Conference on Computer Vision and Pattern Recognition (CVPR), vol. 1, 2006, pp. 519-528.

Stein, et al., "Structural Indexing: Efficient 3-D Object Recognition", IEEE Transactions on Pattern Analysis and Machine Intelligence, vol. 14, No. 2, Feb. 1992, pp. 125-145.

Stuhmer, et al., "Real-Time Dense Geometry from a Handheld Camera", Springer-Verlag Berlin, LNCS 6376, Conference on Pattern Recognition (DAGM), 2010, pp. 11-20.

Thrun, et al., "Probabilistic Robotics", The MIT Press, Cnapter 9, Sep. 2005, pp. 281-335.

van Dam, et al., "Immersive VR for Scientific Visualization: A Progress Report", retrieved on Nov. 24, 2010 at <<http://ieeexplore.ieee.org/stamp/stamp.jsp?tp=&arnumber=888006>>, IEEE Computer Society, IEEE Computer Graphics and Applications, vol. 20, No. 6, Nov. 2000, pp. 26-52.

Vaughan-Nichols, "Game-Console Makers Battle over Motion-Sensitive Controllers", retrieved on Nov. 24, 2010 at <<http://ieeexplore.ieee.org/stamp/stamp.jsp?tp=&arnumber=5197417>>, IEEE Computer Society, Computer, Aug. 2009, pp. 13-15.

Vidal, et al., "Pursuit-Evasion Games with Unmanned Ground and Aerial Vehicles", retrieved on Nov. 24, 2010 at <<http://ieeexplore.ieee.org/stamp/stamp.jsp?tp=&arnumber=933069>>, IEEE, Proceedings of IEEE Intl Conference on Robotics and Automation, Seoul, Korea, May 2001, pp. 2948-2955.

Vogiatzis, et al., "Reconstructing relief surfaces", Elsevier Press, Image and Vision Computing, vol. 26, 2008, pp. 397-404.

Welch, et al., "Motion Tracking: No Silver Bullet, but a Respectable Arsenal", retrieved on Nov. 24, 2010 at <<http://ieeexplore.ieee.org/stamp/stamp.jsp?tp=&arnumber=1046626>>, IEEE Computer Society, IEEE Computer Graphics and Applications, vol. 22, No. 6, Nov. 2002, pp. 24-38.

Williams, et al., "Real-Time SLAM Relocalisation", retrieved on Nov. 26, 2010 at <<http://www.robots.ox.ac.uk:5000/~lav/Papers/williams_etal_iccv2007/williams_etal_iccv2007.pdf>>, IEEE, Proceedings of Intl Conference on Computer Vision (ICCV), Rio de Janeiro, Brazil, Oct. 2007, pp. 1-8.

Wilson, et al., "Combining Multiple Depth Cameras and Projectors for Interactions on, Above, and Between Surfaces", retrieved on Nov. 29, 2010 at <<http://research.microsoft.com/en-us/um/people/awilson/publications/wilsonuist2010/Wilson%20UIST%202010%20LightSpace.pdf>>, ACM, Proceedings of Symposium on User Interface Software and Technology (UIST), New York, NY, Oct. 2010, pp. 273-282.

Wurm, et al., "OctoMap: A Probabilistic, Flexible, and Compact 3D Map Representation for Robotic Systems", Proceedings of Workshop on Best Practice in 3D Perception and Modeling for Mobile Manipulation (ICRA), Anchorage, Alaska, May 2010, 8 pages.

Yu, et al., "Monocular Video Foreground/Background Segmentation by Tracking Spatial-Color Gaussian Mixture Models", retrieved on Nov. 28, 2010 at <<http://research.microsoft.com/en-us/um/people/cohen/segmentation.pdf>>, IEEE, Proceedings of Workshop on Motion and Video Computing (WMVC), Feb. 2007, pp. 1-8.

Zach, et al., "A Globally Optimal Algorithm for Robust TV-L1 Range Image Integration", IEEE Proceedings of Intl Conference on Computer Vision (ICCV), 2007, pp. 1-8.

Zhou, et al., "Data-Parallel Octrees for Surface Reconstruction", IEEE Transactions on Visualization and Computer Graphics, vol. 17, No. 5, May 2011, pp. 669-681.

Zhou, et al., "Highly Parallel Surface Reconstruction", retrieved on Nov. 29, 2010 at <<http://research.microsoft.com/pubs/70569/tr-2008-53.pdf>>, Microsoft Corporation, Microsoft Research, Technical Report MSR-TR-2008-53, Apr. 2008, pp. 1-10.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

REAL-TIME CAMERA TRACKING USING DEPTH MAPS

BACKGROUND

For many applications it is valuable to be able to track orientation and position of a camera as it moves in an environment. For example, in robotics, vehicle navigation, computer game applications, medical applications and other problem domains. Previous approaches have involved using color images captured by moving cameras, identifying features in those images such as lines and edges and tracking that information in a sequence of color images captured by the camera to try and estimate relative camera position. Existing approaches are limited in accuracy, robustness and speed. However, for many applications, accurate camera tracking is required in real-time, for example, in order that a robot may successfully move about in its environment.

The embodiments described below are not limited to implementations which solve any or all of the disadvantages of known camera tracking processes.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Real-time camera tracking using depth maps is described. In an embodiment depth map frames are captured by a mobile depth camera at over 20 frames per second and used to dynamically update in real-time a set of registration parameters which specify how the mobile depth camera has moved. In examples the real-time camera tracking output is used for computer game applications and robotics. In an example, an iterative closest point process is used with projective data association and a point-to-plane error metric in order to compute the updated registration parameters. In an example, a graphics processing unit (GPU) implementation is used to optimize the error metric in real-time. In some embodiments, a dense 3D model of the mobile camera environment is used.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a real-time camera tracking system using depth images obtained from a mobile depth camera which emits and captures infra-red light, the system described is provided as an example and not a limitation. As those skilled in the art will appreciate, the present examples are suitable for application in a variety of different types of real-time camera tracking systems including but not limited to those using depth information obtained from stereo cameras and those using depth information obtained by emitting and capturing other types of electromagnetic radiation.

The term "image element" is used in this document to refer to a pixel, group of pixels, voxel, group of voxels, or other higher level component of an image.

The term "dense 3D model" is used in this document to refer to a representation of a three dimensional scene comprising objects and surfaces where that representation comprises detail about image elements of that scene. In contrast non-dense 3D models may comprise frame-based representations of objects. In an example, all or many points from an incoming depth map may be used to describe surfaces in the environment and this description forms a dense 3D model. A sparse model would only take a subset of the points to speed up calculations and reduce memory footprint.

Figure 1:
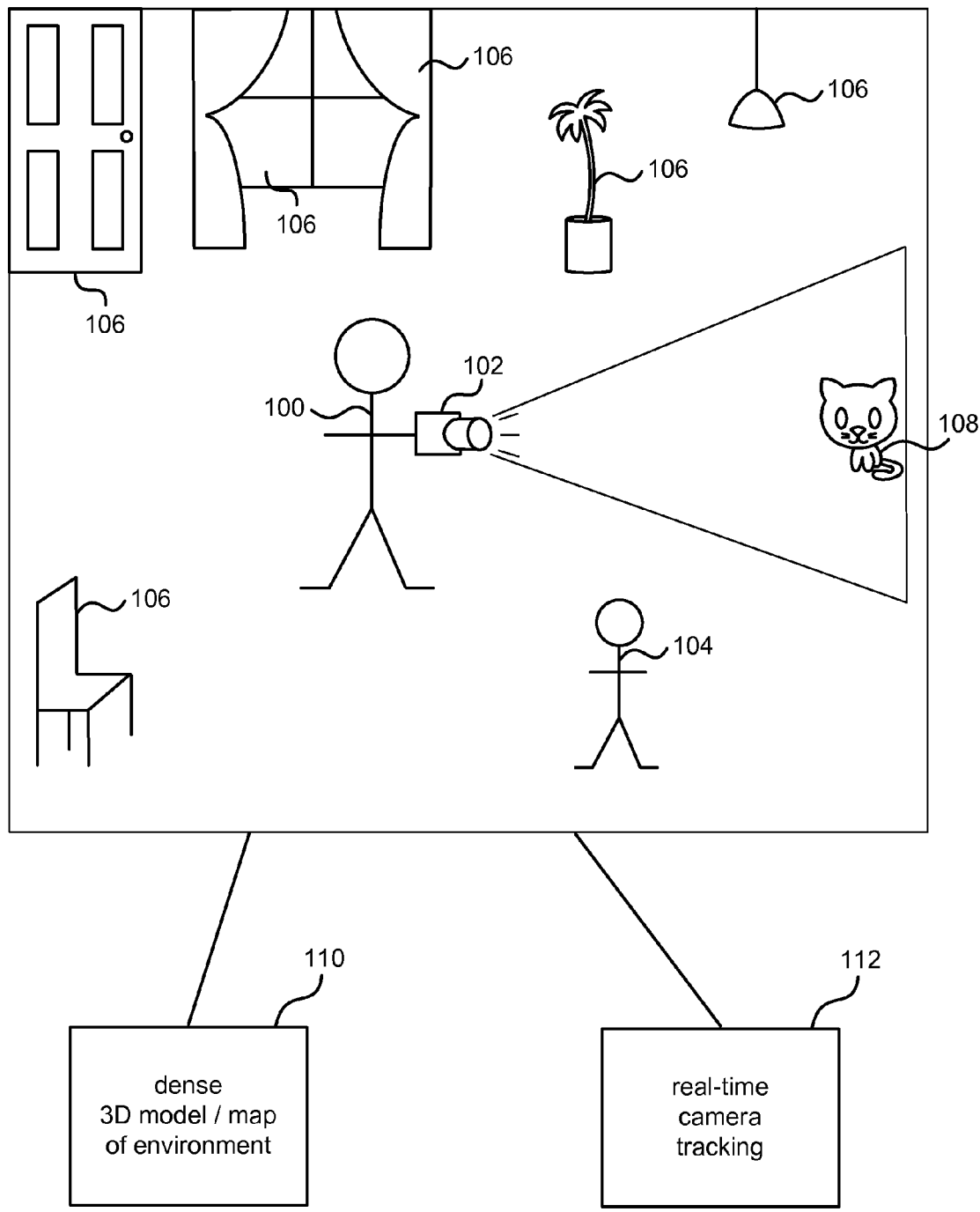
FIG. 1 is a schematic diagram of a person in a room holding a mobile depth camera which may be used for real-time camera tracking and optionally also to produce a dense 3D model or map of the room.

FIG. 1 is a schematic diagram of a person 100 standing in a room and holding a mobile depth camera 102 which in this example also incorporates a projector which is projecting the image of a cat 108 into the room. The room contains various objects 106 such as a chair, door, window, plant, light and another person 104. Many of the objects 106 are static although some of the objects such as person 104 may move. As the person moves around the room the mobile depth camera captures images which are used by a real-time camera tracking system 112 to monitor the location and orientation of the camera in the room. The real-time camera tracking system 112 may be integral with the mobile depth camera 102 or may be at another location provided that it is able to receive communication from the mobile depth camera 102, either directly or indirectly. For example, the real-time camera tracking system 112 may be provided at a personal computer, dedicated computer game apparatus, or other computing device in the room and in wireless communication with the mobile depth camera 102. In other examples the real-time camera tracking system 112 may be elsewhere in the building or at another remote location in communication with the mobile depth camera 102 using a communications network of any suitable type. The mobile depth camera 102 is also in communication with a dense 3D model 110 of the environment (which in this case is a 3D model of the room) or another type of map of the environment. For example, images captured by the mobile depth camera 102 are used to form and build up the dense 3D model of the environment as the person moves about the room. The real-time camera tracking system 112 may track the position of the camera in relation to the 3D model or map of the environment 110. The outputs of the real-time camera tracking system 112 and dense 3D model or map 110 may be used by a game system or other application although that is not essential. For example, a projector at the mobile depth camera 102 may be arranged to project images depending on the output of the real-time camera tracking system 112 and 3D model 110.

Figure 2:
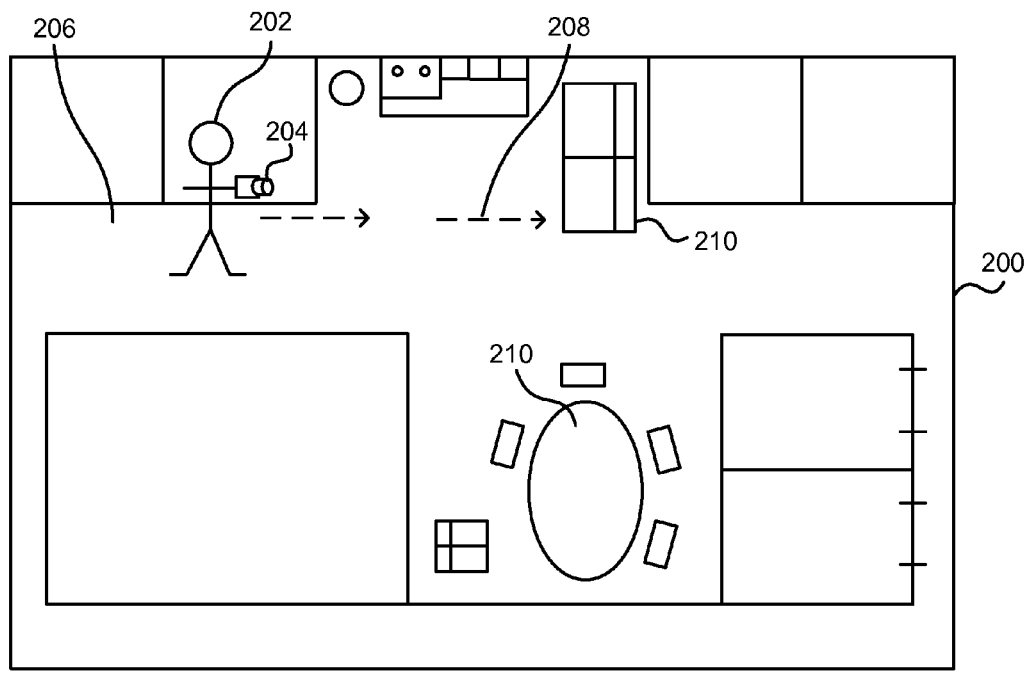
FIG. 2 is a plan view of a floor of a building which is being explored by a person holding a mobile depth camera.

FIG. 2 is a plan view of a floor 200 of a building. A person 202 holding a mobile depth camera 204 is moving around the floor as indicated by dotted arrows 208. The person walks along a corridor 206 past rooms and furniture 210. The real-time camera tracking system 112 is able to track the position of the mobile depth camera 204 as it moves and a 3D model or map of the floor is formed. It is not essential for a person 202 to carry the mobile depth camera 204. In other examples the mobile depth camera 204 is mounted on a robot or vehicle. This also applies to the example of FIG. 1.

Figure 3:
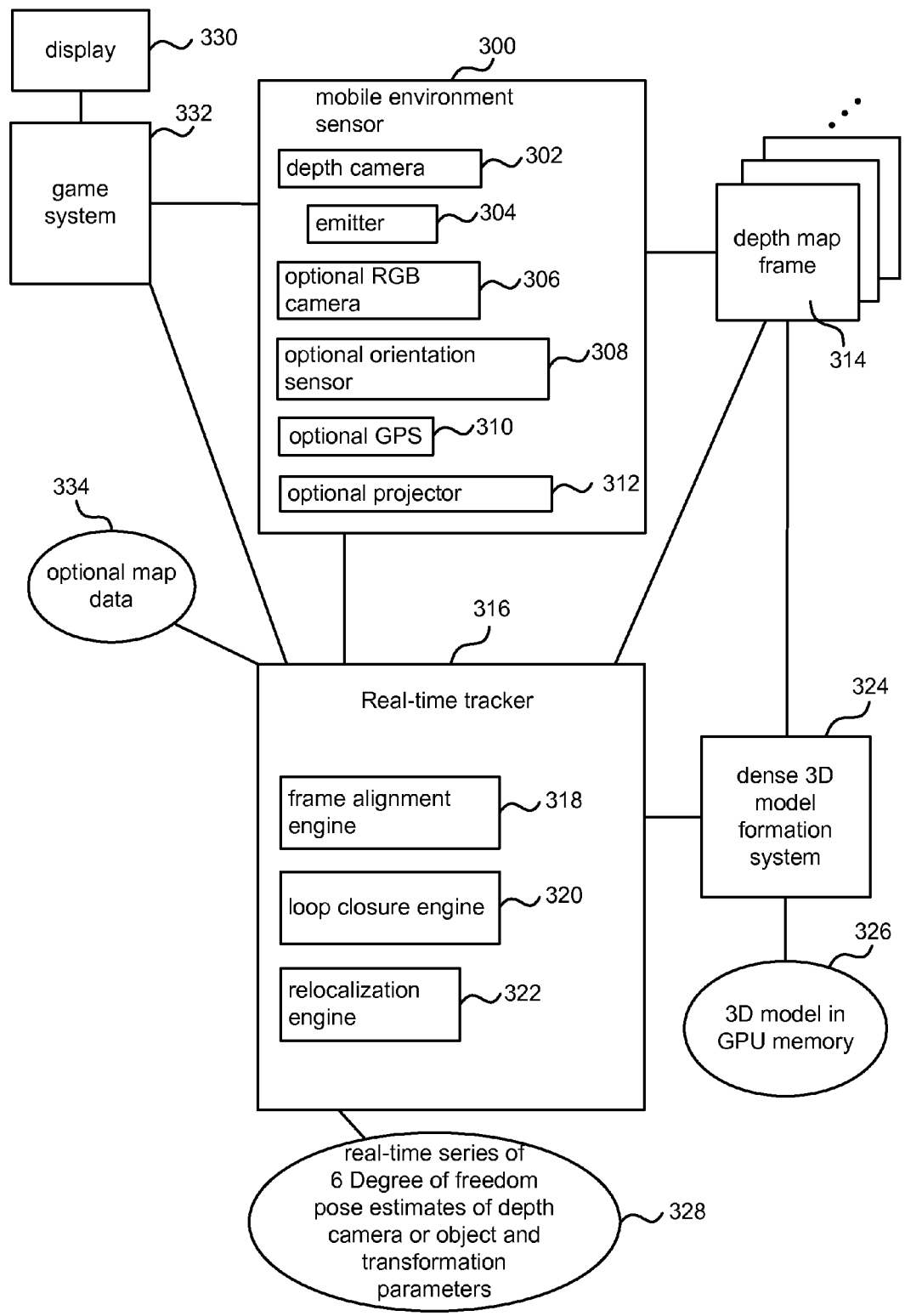
FIG. 3 is a schematic diagram of a mobile depth camera connected to a real-time camera tracking system, a dense 3D model formation system and a game system.

FIG. 3 is a schematic diagram of a mobile environment sensor 300 for use with a real-time camera tracker 316, dense model formation system 324 and optionally a game system 332. The mobile environment sensor 300 comprises a depth camera 302 which is arranged to capture sequences of depth images of a scene. Each depth image or depth map frame 314 comprises a two dimensional image in which each image element comprises a depth value such as a length or distance from the camera to an object in the captured scene which gave rise to that image element. This depth value may be an absolute value provided in specified units of measurement such as meters, or centimeters or may be a relative depth value. In some cases the depth value may be a disparity value such as in situations where stereo depth information is available. In each captured depth image there may be around 300,000 or more image elements each having a depth value. The frame rate is high enough to enable the depth images to be used for working robotics, computer game or other applications. For example, at least 20 frames per second.

The depth information may be obtained using any suitable technique including but not limited to, time of flight, structured light, stereo images. In some examples the depth camera is able to organize the depth information into Z layers that are perpendicular to a Z axis extending along a line of sight of the depth camera.

The mobile environment sensor 300 may also comprise an emitter 304 arranged to illuminate the scene in such a manner that depth information may be ascertained by the depth camera 302. For example, in the case that the depth camera 302 is an infra-red (IR) time-of-flight camera, the emitter 304 emits IR light onto the scene, and the depth camera 302 is arranged to detect backscattered light from the surface of one or more objects in the scene. In some examples, pulsed infrared light may be emitted from the emitter 304 such that the time between an outgoing light pulse and a corresponding incoming light pulse may be detected by the depth camera and measure and used to determine a physical distance from the environment sensor 300 to a location on objects in the scene. Additionally, in some examples, the phase of the outgoing light wave from the emitter 304 may be compared to the phase of the incoming light wave at the depth camera 302 to determine a phase shift. The phase shift may then be used to determine a physical distance from the mobile environment sensor 300 to a location on the objects by analyzing the intensity of the reflected beam of light over time via various techniques including, for example, shuttered light pulse imaging.

In another example, the mobile environment sensor 300 can use structured light to capture depth information. In such a technique patterned light (e.g. light displayed as a known pattern such as a grid or stripe pattern) may be projected onto a scene using the emitter 304. Upon striking the surface of objects in the scene the pattern becomes deformed. Such a deformation of the pattern is captured by the depth camera 302 and analyzed to determine an absolute or relative distance from the depth camera 302 to the objects in the scene. In some cases, the mobile environment sensor 300 emits a spatially varying and/or time varying pattern of electromagnetic radiation and that pattern is calibrated so that when an image is received by the depth camera 302 it is able to perform pattern matching against a database of patterns and thus calculate depth information. This can be thought of as a 3D pattern of dots being projected into the environment, and wherever there is a surface that pattern is reflected so the depth camera 302 can detect it and calculate the distance of that surface from the depth camera 302.

In another example, the depth camera 302 comprises a pair of stereo camera such that visual stereo data is obtained and resolved to generate relative depth information. In this case the emitter 304 may be used to illuminate the scene or may be omitted.

In some examples, in addition to the depth camera 302, the mobile environment sensor 300 comprises a color video camera referred to as an RGB camera 306. The RGB camera 306 is arranged to capture sequences of images of the scene at visible light frequencies.

The mobile environment sensor 300 may comprise an orientation sensor 308 such as an inertial measurement unit (IMU), accelerometer, gyroscope, compass or other orientation sensor 308. However, it is not essential to use an orientation sensor. The mobile environment sensor 300 may comprise a location tracking device such as a GPS although this is not essential.

The mobile environment sensor may comprise a projector 312 as mentioned above with reference to FIG. 1 although this is not essential.

The mobile environment sensor also comprises one or more processors, a memory and a communications infrastructure as described in more detail below.

The mobile environment sensor may be provided in a housing which is shaped and sized to be hand held by a user or worn by a user. In other examples the mobile environment sensor is sized and shaped to be incorporated or mounted on a vehicle, toy or other movable apparatus.

The mobile environment sensor 300 is connected to a real-time tracker 316. This connection may be a physical wired connection or may use wireless communications. In some examples the mobile environment sensor 300 is connected indirectly to the real-time tracker over one or more communications networks such as the internet.

The real-time tracker 316 is computer implemented using a general purpose microprocessor controlling one or more graphics processing units (GPUs). It comprises a frame alignment engine 318 and optionally a loop closure engine 320 and a relocalization engine 322. The real-time tracker 316 takes depth map frames 314 from the depth camera 302, and optionally also input from the mobile environment sensor 300, optional map data 334 and optional data from a game system 332. The real-time tracker operates to place the depth map frames into alignment in order to produce a real-time series 328 of six degree of freedom pose estimates of the depth camera 302. It may also produce transformation parameters (also referred to as registration parameters) for transforms between pairs of depth map frames. In some examples the real-time tracker operates on pairs of depth map frames 314 from the depth camera. In other examples, the real-time tracker 216 takes a single depth map frame 314 and aligns that with a dense 3D model 326 of the scene rather than with another depth map frame 314. In some examples the real-time tracker also uses color video input from the RGB camera 306 although this is not essential.

For example, in some embodiments the real-time tracker 316 provides output to a dense 3D model formation system 324 which uses that information together with the depth map frames 314 to form and store a dense 3D model of the scene or environment in which the mobile environment sensor 300 is moving. For example, in the case of FIG. 1 the 3D model would be a 3D model of the surfaces and objects in the room. In the case of FIG. 2 the 3D model would be a 3D model of the floor of the building. The dense 3D model 326 may be stored in GPU memory or in other ways.

The mobile environment sensor 300 may be used in conjunction with a game system 332 which is connected to a display 330. For example, the game may be a golf game, boxing game, motor car racing game or other type of computer game. Data from the game system 332 such as the game state or meta data about the game may be provided to the real-time tracker 316. Also, information from the real-time tracker may be used by the game system 332 to influence the course of a game. Information from the 3D model may also be used by the game system 332 to influence the course of a game.

Map data 334 is optionally available to the real-time tracker 316. For example, this may be an architect's drawing of the environment (e.g. room or floor of building), the location of landmarks known in the environment, a map of the environment available from another source.

The frame alignment engine 318 of the real-time tracker is arranged to align pairs of depth map frames or a depth map frame and an estimate of a depth map frame from the dense 3D model. It uses an iterative process which is implemented using one or more graphics processing units in order that the frame alignment engine operates in real-time. More detail about the frame alignment engine is given below with reference to FIG. 4. The loop closure engine is arranged to detect when the mobile environment sensor has moved in a loop so that the scene depicted in the current depth frame is at least partially overlapping with that of a previous depth frame which is not the immediately preceding depth frame. For example, this may occur when a user walks around the whole floor of the building in FIG. 2 and reaches the starting point again. It may also occur when a user moves around a room behind some furniture and out again to the original start position, or close to that original start position.

The relocalization engine 322 is arranged to deal with the situation where the real-time tracker loses the current location of the mobile environment sensor 300 and relocalizes or finds the current location again.

The processing performed by the real-time tracker 316 and/or the dense 3D model formation system 324 can, in one example, be executed remotely from the location of the mobile environment capture device 300. For example, the mobile environment capture device 300 can be connected to (or comprise) a computing device having relatively low processing power, and which streams the depth images over a communications network to a server. The server has relatively high processing power, and performs the computationally complex tasks of the real-time tracker 316 and/or the dense 3D model formation system 324. The server can return a rendered image of the dense reconstruction per-frame to provide an interactive experience to the user, and also return the final dense 3D reconstruction on completion of the model, for subsequent local use (e.g. in a game). Such an arrangement avoids the need for the user to possess a high-powered local computing device.

In an example, input from an RGB camera at the mobile environment sensor may be used to complement information from the depth camera. This is useful in situations where depth does not provide adequate information for tracking, such as when a camera is moving in an environment with few depth features. If visual features are present in the environment these may be detected by the RGB camera and used to enable simultaneous localization and mapping to be provided.

Figure 4:
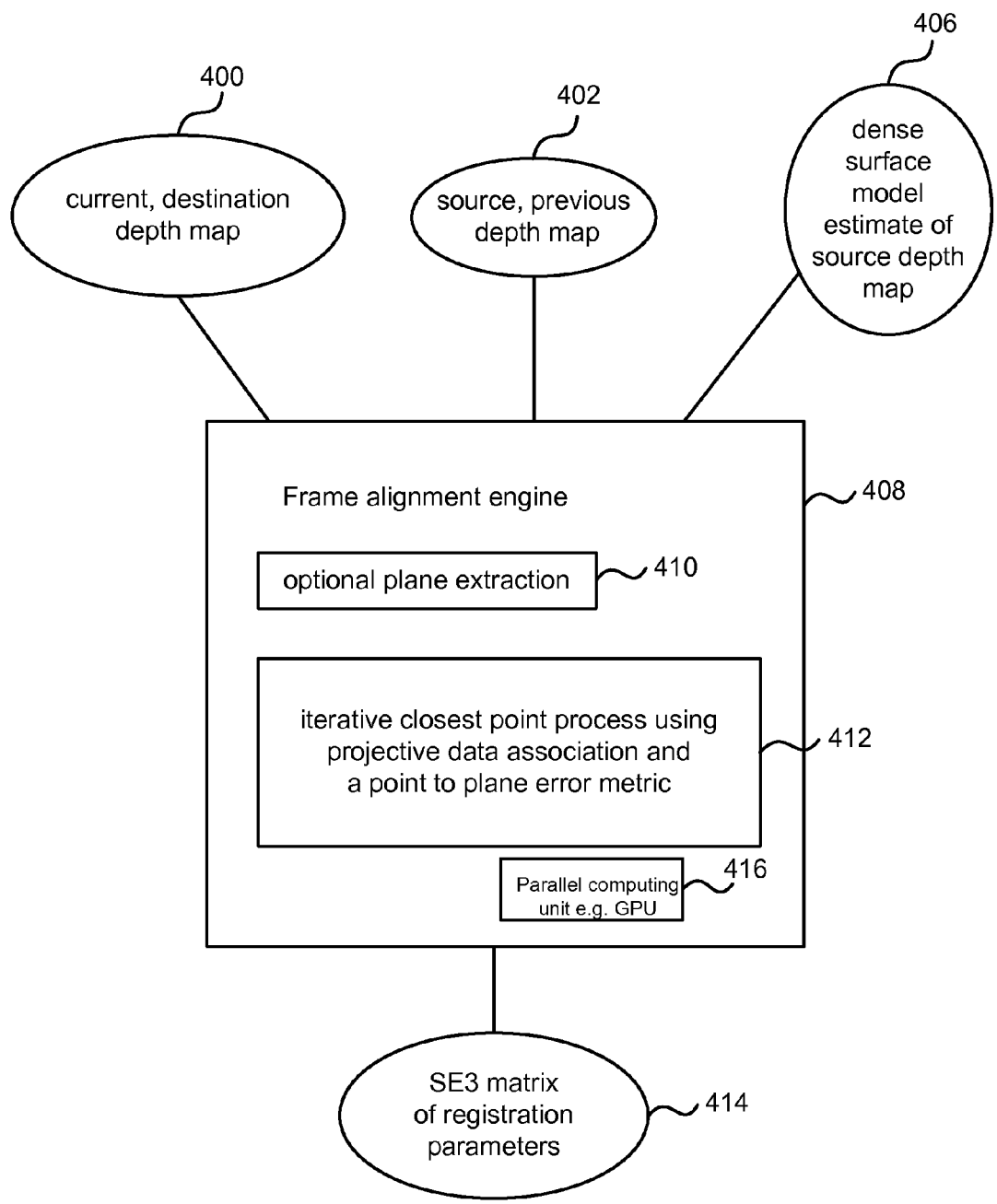
FIG. 4 is a schematic diagram of an example frame alignment engine.

FIG. 4 is a schematic diagram of the frame alignment engine 318 of FIG. 3 in more detail. The frame alignment engine 408 is computer implemented at a computing device having one or more GPUs 416 or other parallel computing units. For example, the parallel computing units may be vector processors, single instruction multiple data (SIMD) architectures, graphics processing units or other parallel computing devices. It comprises a plane extraction component 410 which is optional and an iterative closest point process 412. The iterative closest point process uses projective data association and a point-to-plane error metric as described in more detail below. The frame alignment engine receives the current depth map 400 from the depth camera. This is also referred to as the destination depth map. In some examples it also receives a source depth map 402 which is the previous depth map frame from the depth camera. In other examples, the frame alignment engine takes a dense surface model estimate 406 of the source depth map. The output of the frame alignment engine is a set of registration parameters of a transform for aligning the current and source frames (or frame estimate). In some examples these registration parameters are provided as a six degree of freedom (6DOF) pose estimate in the form of an $SE_3$ matrix describing the rotation and translation of the depth camera 302 relative to real-world coordinates. More formally, this transformation matrix can be expressed as:

$$T_k = \begin{bmatrix} R_k & t_k \\ 0^T & 1 \end{bmatrix} \in SE_3$$

Where $T_k$ is the transformation matrix for depth image frame k, $R_k$ is the camera rotation for frame k, $t_k$ is the camera translation at frame k, and Euclidean group $SE_3:=\{R, t | R \in SO_3, t \in \mathbb{e}^3\}$. Coordinates in the camera space (i.e. from the camera perspective) can be mapped to real-world coordinates by multiplying by this transformation matrix.

However, the registration parameters may be provided in any suitable form. These registration parameters are used by the real time tracker 316 to produce the real-time series of 6 degree of freedom pose estimates of the depth camera.

Figure 5:
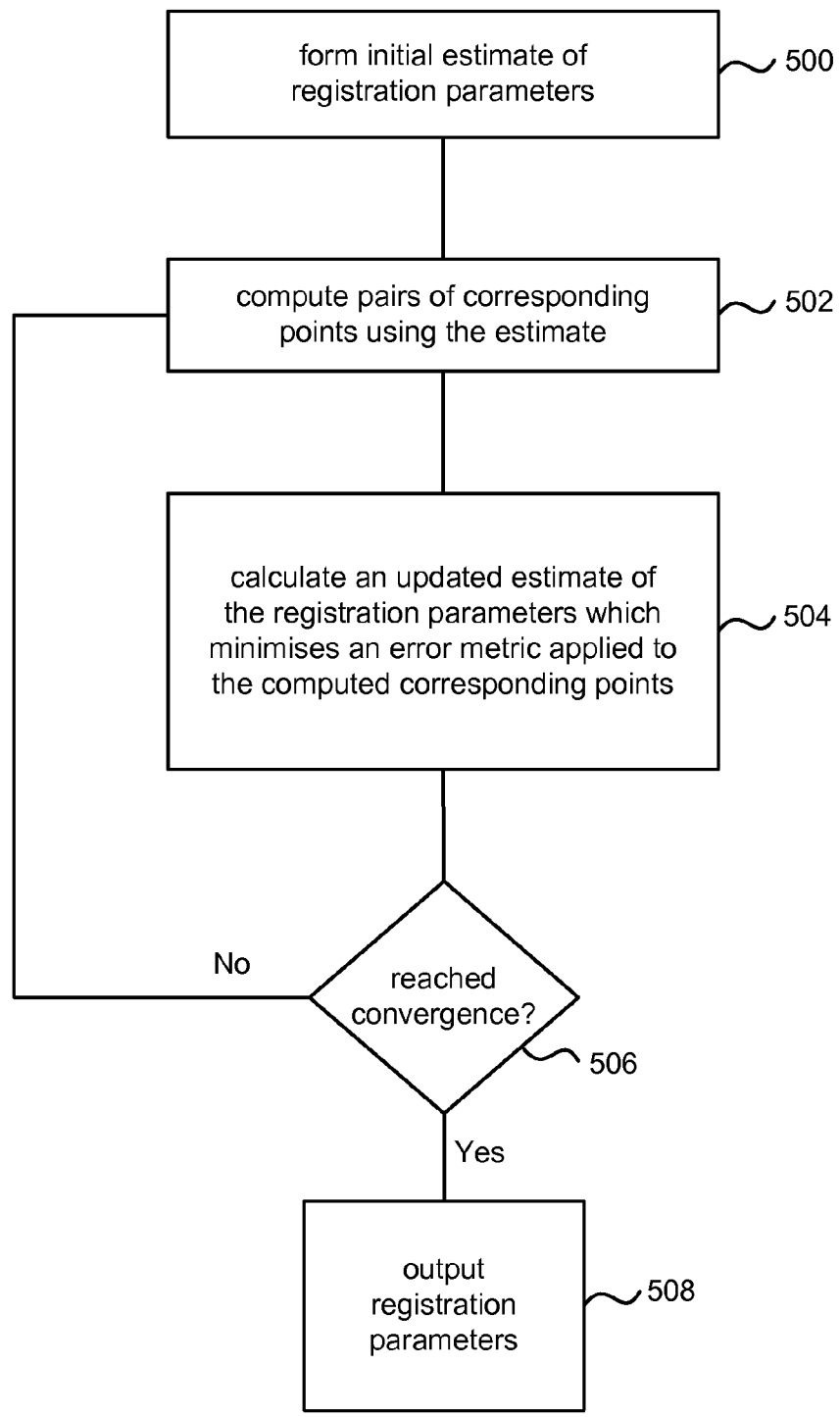
FIG. 5 is a flow diagram of an iterative process for camera tracking.

FIG. 5 is a flow diagram of an example iterative process at a frame alignment engine. An initial estimate of the registration parameters is formed 500. These are the registration parameters of a transform for aligning the current and source frames. This initial estimate is formed in any suitable manner. For example, one or more of the following sources of information may be used to form the initial estimate: game state, game meta data, map data, RGB camera output, orientation sensor output, GPS data. In another example, the initial estimate is formed by predicting where the camera is using information about the previous motion path of the camera. For example, the camera may be assumed to have a constant velocity or a constant acceleration. The motion path of the camera from time 0 to time t−1 may be used to estimate where the camera will be at time t and thus obtain an estimate of the registration parameters.

Using the initial estimate, pairs of corresponding points between the current and source frames (depth maps or estimated depth maps) are computed 502. A pair of corresponding points is a point from one depth map and a point from another depth map, where those points are estimated to have arisen from the same real world point in a scene. The term "point" is used here to refer to a pixel, or a group or patch of neighboring pixels. This correspondence problem is very difficult because of the huge number of possible combinations of points. Previous approaches using color or grey-scale images have addressed this problem by identifying shapes such as lines, edges, corners or the like in each image and then trying to match those shapes between the pair of images. In contrast, the embodiments described herein identify corresponding points without the need to find shapes in the depth maps. More detail about how the corresponding points are computed is given below with reference to FIG. 6. An updated estimate of the registration parameters is calculated 504 which optimizes an error metric applied to the computed corresponding points.

A check is made to assess whether convergence has been reached 506. If so, there is little or no change in the updated estimate and the registration parameters are output 508. If not, the iterative process repeats as indicated in FIG. 5.

Figure 6:
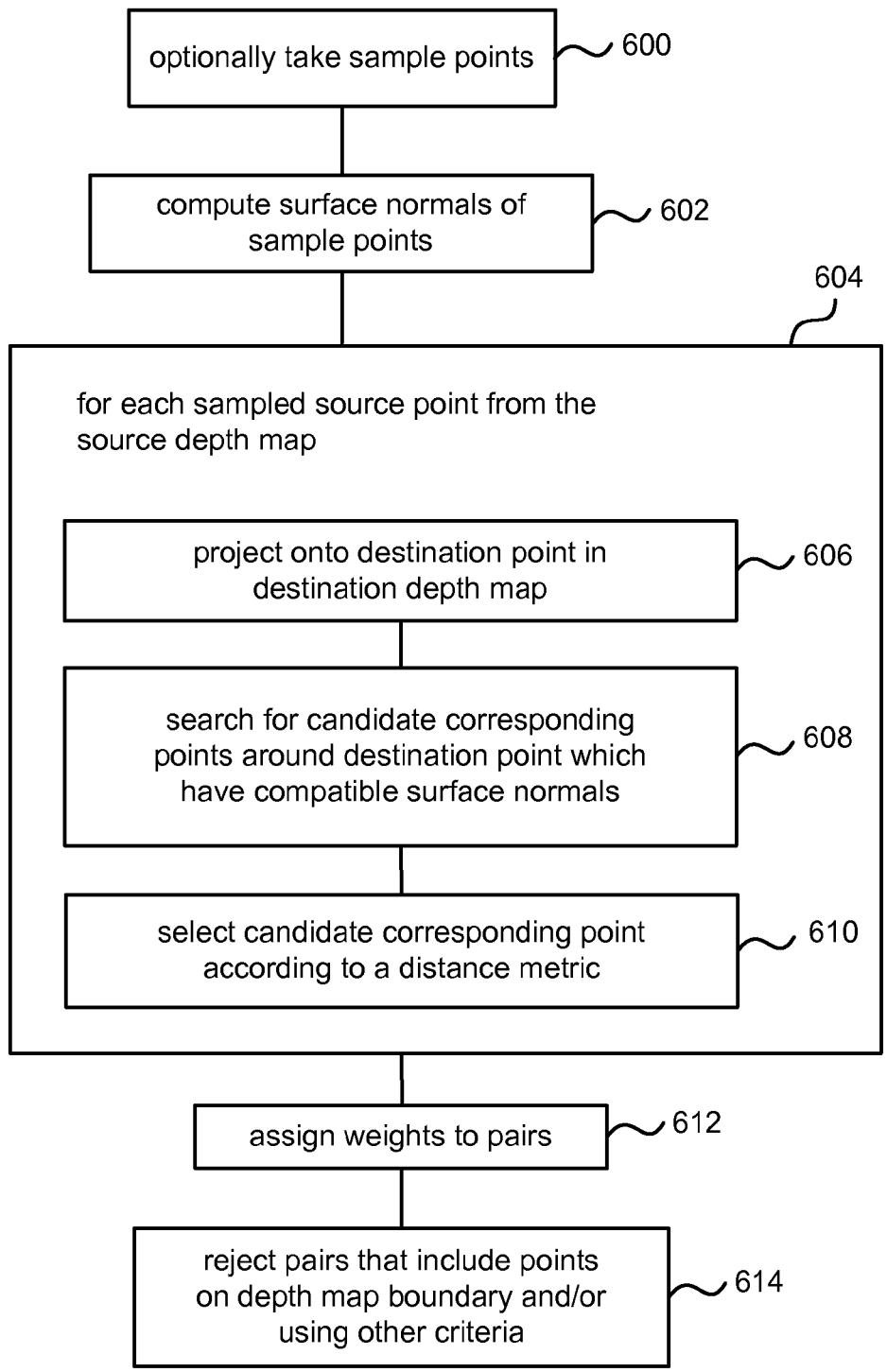
FIG. 6 is a flow diagram of more detail of part of the iterative process of FIG. 5 for computing pairs of corresponding points.

With reference to FIG. 6 more detail is now given about how the pairs of corresponding points are calculated. In some embodiments sample points are taken 600 from either or both of the current and source depth maps and those sample points are used as candidates to find pairs of corresponding points from. Sampling may be achieved by randomly selecting a specified proportion of the points. In another embodiment sampling is achieved in a manner which takes into account surface normals of the points. For example, a surface normal is calculated for each point (as described in more detail below) and a histogram created with a plurality of bins for different ranges of surface normal values. Sampling is carried out so that a uniform sampling across the bins is achieved.

By using sampling the benefit that computational costs are reduced is achieved. However, a risk is that the accuracy and robustness of the process is reduced when sampling is used. This is because the sample points may not provide a good indication of the depth map that the samples were taken from. For example, the samples may enable the process to find a set of corresponding points which the process identifies as a solution but which in fact represent a locally optimal solution rather than a globally optimal solution.

Having said that, it is not essential to use any sampling. The process is also workable and gives good results when all the available points are used. In this case the parallel processing implementation described herein allows the process to operate in real-time for all the points in each depth map which may be as many as 300,000 or more. In the example described below with reference to FIG. 6 the process is described as using sampling. However, the process of FIG. 6 is also applicable where no sampling is carried out.

As indicated in FIG. 6, surface normals of the sample points (or each available point in the case that no sampling is done) are computed 602. For example, this is achieved for a given point by finding two (or more) nearest neighbor points in the depth map and computing a surface patch which incorporates those neighbors and the point itself. A normal to that surface patch is then calculated at the location of the point.

A process of finding 604 corresponding pairs of points is then followed. This is now described in the case that the source and current depth maps are available without the use of a dense 3D model. For each sampled source point from the source depth map, a ray is projected 606 from the camera location associated with the source depth map, through the sampled source point and onto a destination point in the destination depth map. In some cases the destination point may be in front of the sampled source point along the projected ray. This projection process may be referred to as "projective data association". A search 608 is then made for candidate corresponding points around and including the destination point. For example, the search is for points which have surface normals that are compatible with the surface normal of the sampled source point and which are within a specified Euclidean distance of the destination point. Surface normals are said to be compatible if they are within a specified range of one another. For example, this specified range and the Euclidean distance may be user configurable and/or set using empirical data relating to the particular application conditions concerned.

One or more candidate corresponding points are found as a result of this search. From those candidate corresponding points a single point is selected 610 to form a pair with the source point. This selection is made on the basis of a distance metric. For example, a Euclidean distance is calculated between the source point and each of the candidate corresponding points. The pair which gives the smallest Euclidean distance is then selected. The process of box 604 is then repeated for each of the sampled source points or in the case that no sampling is done, for each of the available points of the source depth map.

In some embodiments weights are assigned 612 to each of the pairs of corresponding points. For example weights may be assigned using information from other sources such as an RGB camera or other sensors. In an example, a weight related to measurement characteristics of the depth camera such as radial lens distortion and/or depth dependent error is computed and stored with each of the pairs of corresponding points. In another example, pairs that include a point which is at an edge detected in the depth map using an edge detection algorithm are weighted higher than other pairs. These weights may be used during the process of applying the error metric in order to improve the quality of the results. For example, weights related to depth dependent error enable high depth values which are likely to fluctuate a lot due to the lack of precision to be taken into account.

In some embodiments pairs that include a point which is on or near a depth map boundary are rejected 614. This helps to avoid errors where overlap between the two depth maps is only partial. Other criteria may also be used to reject pairs. For example, in some embodiments plane extraction is carried out as mentioned above with reference to FIG. 4 component 410. In that case, pairs which are on a plane may be rejected in order to prevent the tracker being biased by a large plane and so ignoring smaller but unique parts within a depth map.

Figure 7:
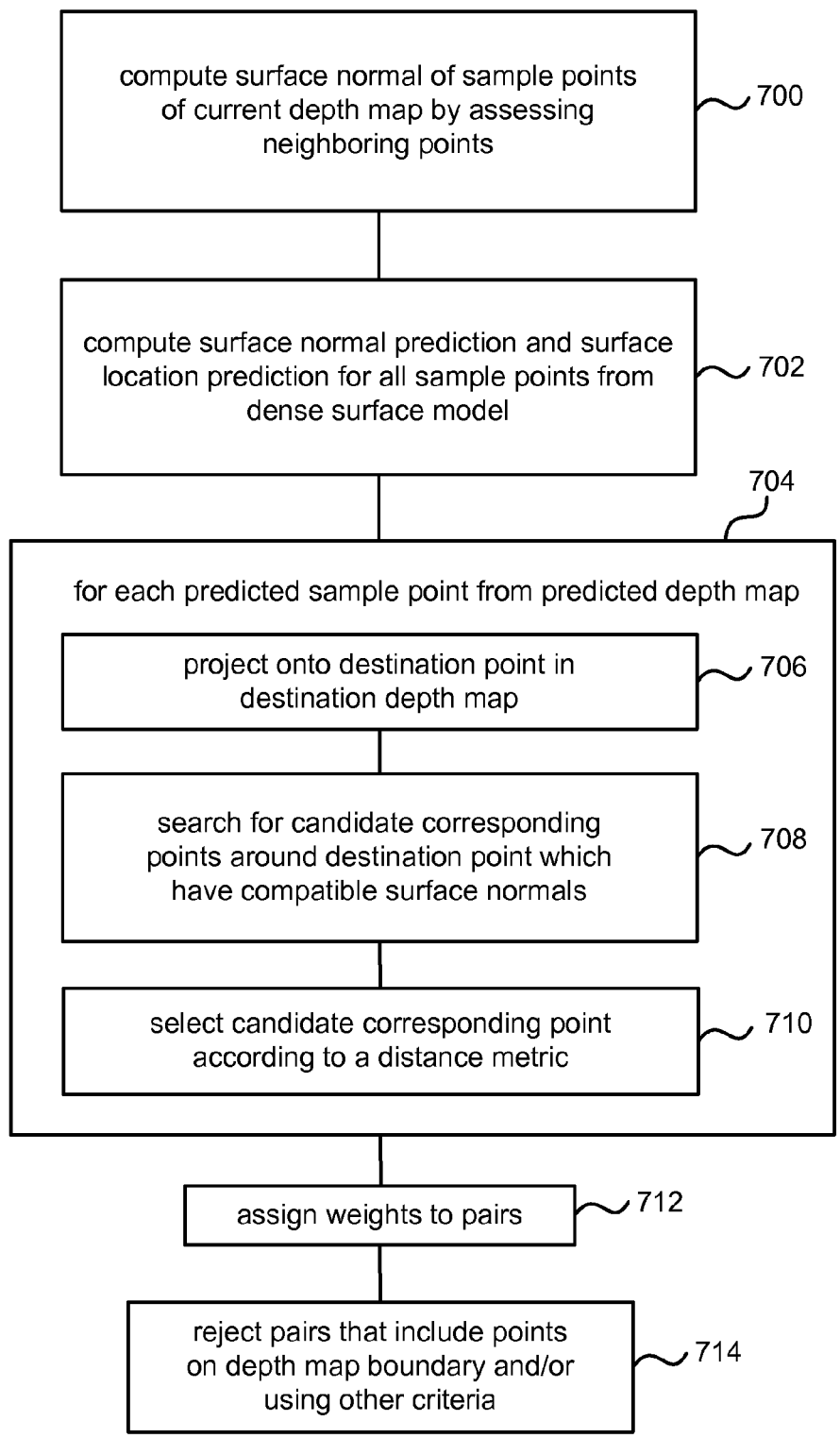
FIG. 7 is a flow diagram of a process for computing pairs of corresponding points using predictions from a dense 3D model.

In some embodiments, the source depth map is estimated or predicted from a dense 3D model of the scene being captured by the depth camera. In this case the method of FIG. 7 is followed. The dense 3D model of the scene comprises a 3D surface representation of the scene stored in memory at a parallel computing unit. For example, the dense 3D model may be stored as a linear array in slice-row-column order (more detail about this is given below), optionally with some padding so that slices and rows align certain memory block sizes. Other ways of storing the 3D model may be used such as oct-trees, coarse-fine representations, mesh-based representations such as polygon meshes.

More detail about the case in which the dense 3D model is stored in "slice-row-column" order on a parallel computing unit such as a GPU is now given. In this case, the model may be stored as a linear array of memory locations used to represent a 3D volume. This is achieved by mapping each voxel to a memory array index using a linear pitched memory which provides fast, parallel access to the data stored on the parallel computing unit memory.

Surface normals of the sample points of the current depth map are computed as described above by assessing 700 neighboring points to the sample point. For the predicted source depth map, a surface normal prediction and a surface location prediction is computed 702 from the dense 3D model for each predicted sample point. A predicted sample point is a point from the dense 3D model which is at the same pixel location as a sample point from the current depth map. This is done by projecting a ray into the volume of the dense surface model. The ray is projected from an estimated camera position and orientation associated with the current depth map and into the 3D model through a point on a face of that 3D model which corresponds to a sample point in the current depth map. This applies in situations where the 3D model is stored as a volumetric representation. In situations where the 3D model is stored using a mesh based representation then this representation is first projected to form a virtual depth image representation. The ray may then be projected into that virtual depth image representation. A first visible surface along that ray is found by stepping along the ray and assessing a surface density function to find a first positive to negative zero crossing. The associated sub pixel world point is found from an estimate of the intersection of the surface density function along the ray. In one example, the surface intersection point along a ray can be computed using a simple linear interpolation given trilinearly sampled points either side of the detected zero crossing to find the sub pixel world point at which a zero occurs. This sub pixel world point is taken as the predicted surface location. To find the predicted surface normal at this location, finite differences of the surface density function gradient are found using tri-linear interpolation. The process of calculating the surface normal prediction and surface location prediction 702 may be implemented at the parallel computing unit with each ray being treated in parallel.

For each predicted sample point (obtained from the dense 3D model) a process 704 is followed to identify a corresponding point in the current depth map. This is similar to the process 604 of FIG. 6. The predicted sample point is projected 706 onto a destination point in the destination depth map (current depth map). A search 708 is then made for candidate corresponding points around the destination point which have compatible surface normals with the destination point. From those candidate corresponding points a point is selected 610 according to a distance metric. For example, a pair of points are compatible if the points are within a specified Euclidean distance e1 of each other and the dot product between the surface normals of the pair is greater than a specified threshold e2. The parameters e1 and e2 may be user configurable or may be set during a manufacturing stage whereby the device is calibrated empirically for use in a particular setting.

In some cases weights are assigned 712 to the pairs of corresponding points. In some embodiments pairs are rejected 714 if they include at least one point which is on or near a depth map boundary. In an example a weight related to the measurement characteristics of the depth camera is stored with each of the pairs of corresponding points. These weights may be used during the process of applying the error metric in order to improve the quality of the results Once pairs of corresponding points have been identified using the process of FIG. 6 or FIG. 7 for example, then an error metric is computed and minimized and the iterative process of FIG. 5 repeats.

In an example a point-to-plane error metric is computed 800 for the pairs of corresponding points and this metric is optimized to obtain updated registration parameters. An example of this process is now described with reference to FIG. 8. This process is designed to be implemented using at least one GPU in order to obtain real time processing as now described.

Computing the point-to-plane error metric can be thought of as computing 802 a sum of squared distances from each source point to a plane which contains the destination point and which is oriented approximately perpendicular to the surface normal of the destination point. The process seeks to optimize this metric to find an updated set of registration parameters. Solving this type of optimization problem is not straightforward and typically requires significant computational resources so making this type of process difficult to implement for real time applications. An example implementation using at least one GPU is now described which enables real-time processing.

The pairs of corresponding points may be scaled and translated 804. This may improve the stability of the optimization process but is not essential.

For each pair of corresponding points a linear system comprising a plurality of simultaneous equations is formed 806 on a parallel computing unit such as a GPU in order to optimize the error metric using numerical least squares optimization. These matrices are reduced to a single 6 by 6 matrix on the parallel computing unit. Because the frame rate is high (for example, 20 to 40 frames per second) then it is possible to make a small angle approximation for the angle (change in camera orientation) between any two successive frames. That is, because the frame rate is so high, the camera will only have moved a small amount between frames. By making this approximation the operation of the system in real-time is facilitated.

The single 6 by 6 matrix is passed to a CPU 808 and solved to find updated registration parameters. The solution is scaled and translated 810 back to reverse the scaling and translation step of 804. The stability of the solution is checked 812 and the updated registration parameters 814 are output by the process.

Figure 9:
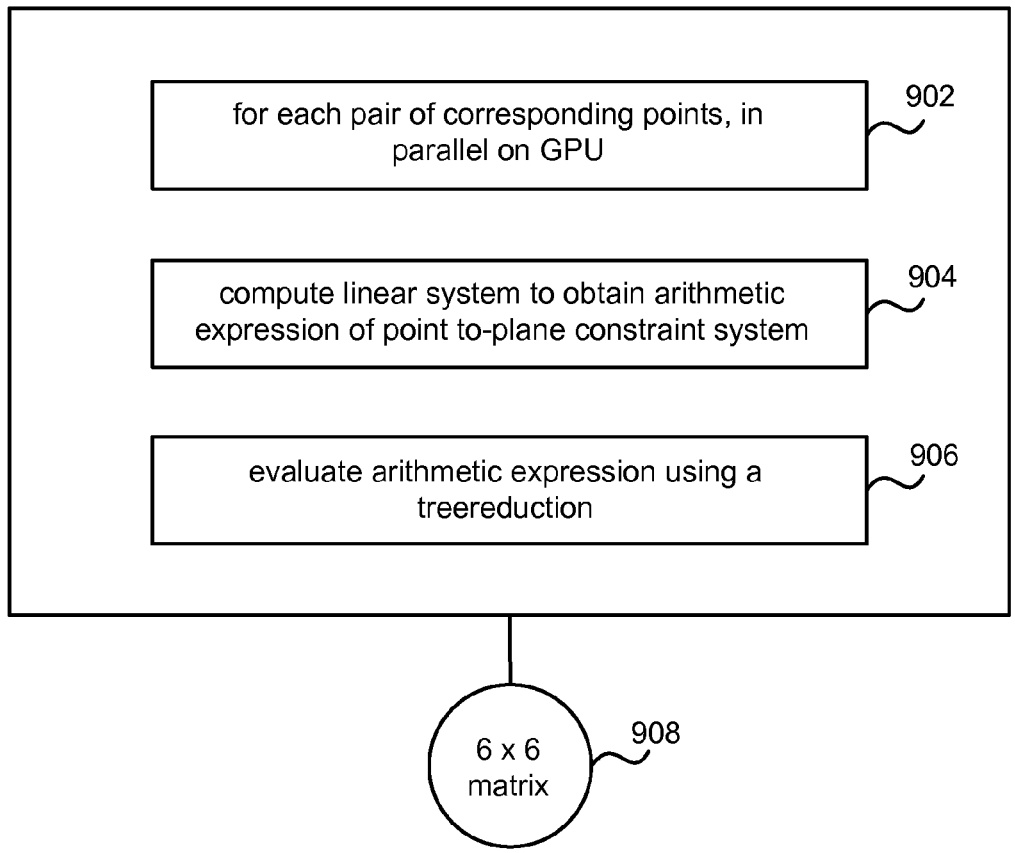
FIG. 9 is a flow diagram of a process at a parallel computing unit such as a graphics processing unit (GPU)

FIG. 9 gives more detail about how the linear system may be formed on a parallel computing unit such as a GPU and reduced to a 6×6 matrix. In this example, the following pointto-plane error metric is used although this is not essential; other error metrics may also be used:

$$\text{argmin}_{T \in SE_3} \sum_{\substack{u \in U \\ \rho_k(u) \neq null}} \left( (Tv_k(u) - \hat{v}^g_{k-1,\rho_k(u)}) \cdot \hat{n}^g_{k-1,\rho_k(u)} \right)^2.$$

This error metric may be used to obtain a new transformation $T_k$. More detail about the symbols used is now given. The current frame k of the depth camera $D_k$ provides calibrated depth measurements $d=D_k(u)$ at image pixel $u=(x,y)$ in the image domain $u \in U$. These measurements may be re-projected into the camera's world space as $v_k(u)=(xd,yd,d,1)$ (using homogeneous coordinates). Since each frame from the depth sensor is a surface measurement on a regular grid, the system may also compute the corresponding normal vectors $n_k(u)$ which are estimated by finite differences between neighbouring re-projected grid points. The $SE_3$ transformation matrix maps the camera coordinate frame at time k into the global frame g as $v_k^g(u)=T_k v_k(u)$. (The equivalent mapping of normal vectors is $n_k^g(u)=R_k n_k(u)$). An estimate of the 3D model in the global coordinate system at time k is denoted $M_k$ which may be stored in a volumetric representation, described herein. An incoming depth frame $D_k$ is registered against the previous frame's estimate of the full 3D reconstructed model $M_{k-1}$, by ray-casting into the previous frame's camera pose $T_{k-1}$. This results in predicted image $\hat{D}_{k-1}$ or equivalently a set of global model points $\hat{v}^g_{k-1,i}$ and model normals $\hat{n}^g_{k-1,i}$ where $i \in S$ is the corresponding index set. The symbol $\rho_k$ in the above equation for the point to plane error metric represents the protective data association mapping between camera and model points at time k.

Figure 8:
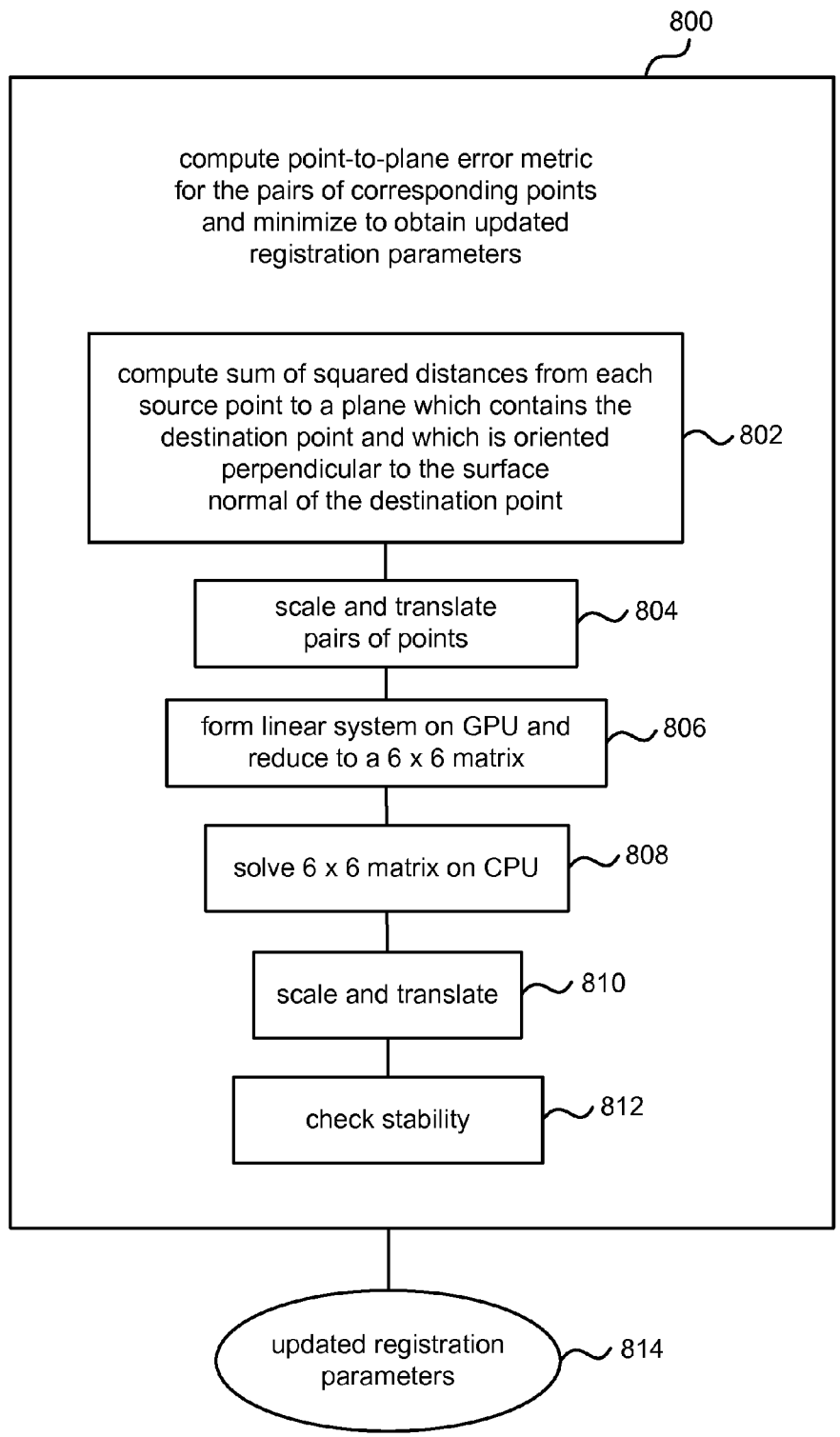
FIG. 8 is a flow diagram of a process for computing and minimizing a point-to-plane error metric for use in the iterative process of FIG. 5.

The method of FIG. 9 is thus an example implementation of the process illustrated in FIG. 8 of forming linear systems for each pair of corresponding points on the GPU and reducing 806 to a single 6 by 6 matrix 908. In this example, each pair of corresponding points that is identified by the frame alignment engine 408 may be processed in parallel 902 at the GPU. Thus for each pair of corresponding points, a 6 by 6 matrix expression a linear system is computed 904 which gives an arithmetic expression of a point-to-plane constraint system. By making the small angle assumption the transformation T may be parametrised using a 3 vector of incremental rotations by a skew symmetric matrix $R \approx [\alpha, \beta, \gamma]_x$ together with a 3 element translation vector t. A linear system is obtained by setting the first derivative of the linearised error metric to zero. This point-to-plane constraint system expresses the optimization of the point-to-plane error metric mentioned above. This computation occurs in parallel for each pair of corresponding points at the GPU. In this way the error metric is applied to each of the identified corresponding points in parallel. The arithmetic expression for each pair of points is evaluated using a tree reduction process 906 or other suitable method of evaluating an arithmetic expression. A tree reduction process is an evaluation strategy whereby an arithmetic expression is represented as a tree structure with nodes of the tree representing arithmetic operations and leaf nodes of the tree representing values. The expression is evaluated in an order according to the tree structure by passing results of evaluations along the branches of the tree. Together the results of the error metric optimization process from the parallel processes provide the 6 by 6 matrix output 908 by reducing the 6 by 6 matrix for each pair of corresponding points into a single 6 by 6 matrix.

Figure 10:
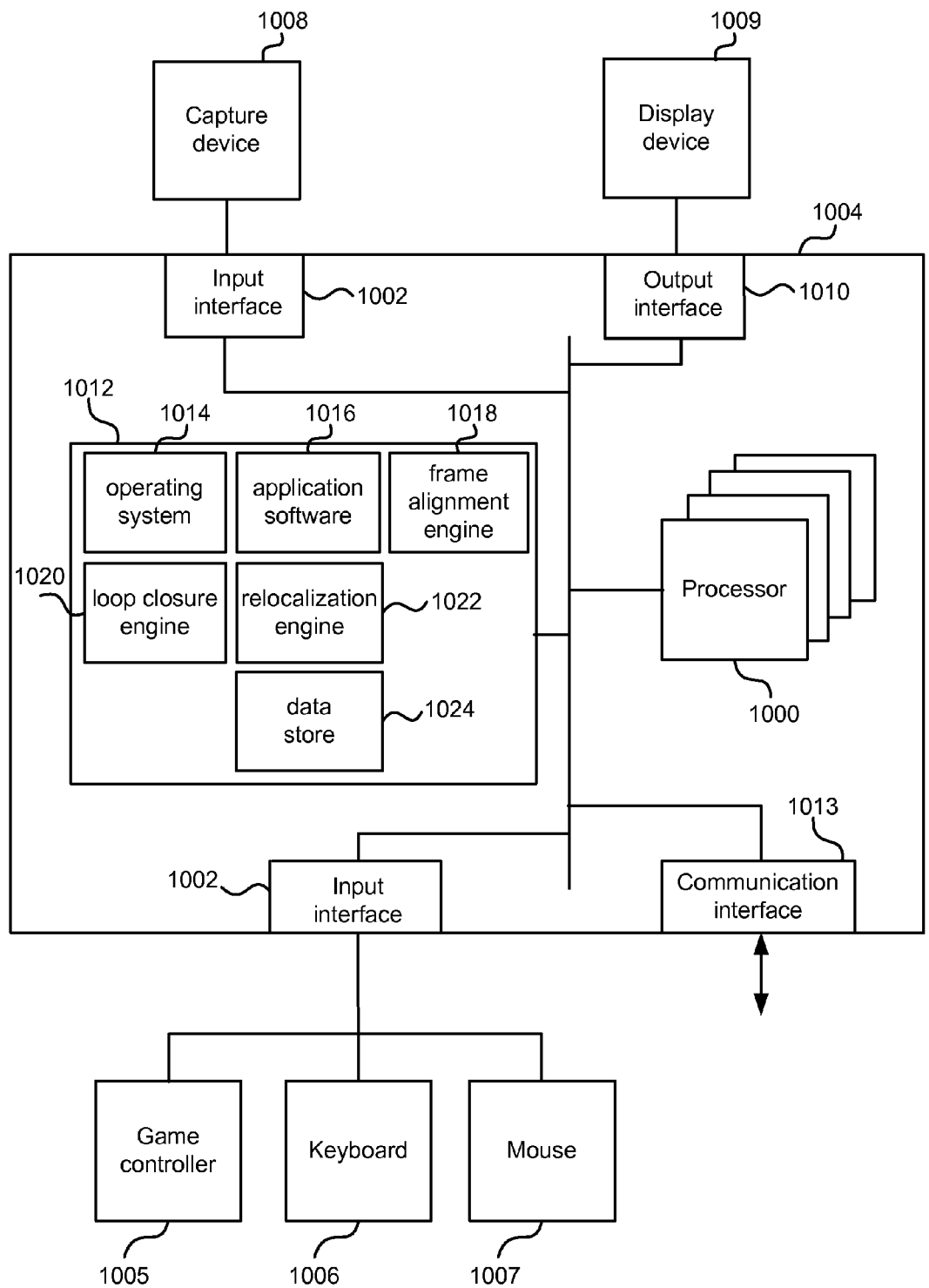
FIG. 10 illustrates an exemplary computing-based device in which embodiments of a real-time camera tracking system may be implemented.

FIG. 10 illustrates various components of an exemplary computing-based device 1004 which may be implemented as any form of a computing and/or electronic device, and in which embodiments of a real-time camera tracker may be implemented.

The computing-based device 1004 comprises one or more input interfaces 1002 arranged to receive and process input from one or more devices, such as user input devices (e.g. capture device 1008, a game controller 1005, a keyboard 1006, a mouse 1007). This user input may be used to control software applications or real-time camera tracking. For example, capture device 1008 may be a mobile depth camera arranged to capture depth maps of a scene. The computing-based device 1004 may be arranged to provide real-time tracking of that capture device 1008.

The computing-based device 1004 also comprises an output interface 1010 arranged to output display information to a display device 1009 which can be separate from or integral to the computing device 1004. The display information may provide a graphical user interface. In an example, the display device 1009 may also act as the user input device if it is a touch sensitive display device. The output interface 1010 may also output date to devices other than the display device, e.g. a locally connected printing device.

Computer executable instructions may be provided using any computer-readable media that is accessible by computing based device 1004. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transport mechanism. As defined herein, computer storage media does not include communication media. Although the computer storage media (memory 1012) is shown within the computing-based device 1004 it will be appreciated that the storage may be distributed or located remotely and accessed via a network or other communication link (e.g. using communication interface 1013).

Computing-based device 1004 also comprises one or more processors 1000 which may be microprocessors, controllers or any other suitable type of processors for processing computing executable instructions to control the operation of the device in order to provide real-time camera tracking. In some examples, for example where a system on a chip architecture is used, the processors 1000 may include one or more fixed function blocks (also referred to as accelerators) which implement a part of the method of real-time camera tracking in hardware (rather than software or firmware).

Platform software comprising an operating system 1014 or any other suitable platform software may be provided at the computing-based device to enable application software 1016 to be executed on the device. Other software than may be executed on the computing device 1004 comprises: frame alignment engine 1018 (see for example, FIGS. 4 to 8 and description above), loop closure engine 1020, relocalization engine 1022. A data store 1024 is provided to store data such as previously received depth maps, registration parameters, user configurable parameters, other parameters, dense 3D models of scenes, game state information, game metadata, map data and other data.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of real-time camera tracking comprising:
receiving a sequence of depth map frames from a moving mobile depth camera each depth map frame comprising a depth value at each image element that depth value being related to a distance from the mobile depth camera to a surface in the scene captured by the mobile depth camera;
tracking the position and orientation of the mobile depth camera by computing registration parameters for each depth map frame, those registration parameters being parameters of a transformation for aligning each depth map frame and a preceding depth map frame;
wherein computing the registration parameters comprises using an iterative process to:
identify corresponding points in pairs of depth map frames without computing shapes depicted within the depth map frames and by using a parallel computing unit to optimize an error metric applied to the identified corresponding points such that the error metric is applied to each of the identified corresponding points in parallel.

2. A method as claimed in claim 1 which further comprises receiving input from a second sensor associated with the mobile depth camera and using that to form an initial estimate of the registration parameters, the second sensor being selected from any of: an orientation sensor, an RGB video camera, a game system, a map of the environment in which the mobile depth camera is moving, a movement sensor, a position sensor.

3. A method as claimed in claim 1 which comprises receiving the sequence of depth map frames at a frame rate of at least 30 frames per second.

4. A method as claimed in claim 1 wherein using the parallel computing unit to optimize an error metric comprises, for each pair of corresponding points, forming a linear system for a numerical least squares optimization and reducing the linear systems to a single 6 by 6 matrix at the parallel computing unit.

5. A method as claimed in claim 4 which comprises passing the 6 by 6 matrix to a central processing unit (CPU) to be solved.

6. A method as claimed in claim 1 which comprises estimating the preceding depth map frame from a dense 3D model of the scene captured by the mobile depth camera.

7. A method as claimed in claim 6 wherein estimating the preceding depth map frame from a dense 3D model of the scene comprises predicting a surface location of a point by projecting a ray into the 3D model and stepping along the ray to find a first positive to negative zero crossing of a surface density function.

8. A method as claimed in claim 1 wherein identifying corresponding points in pairs of depth map frames comprises using a projective data association process whereby an estimated position of the mobile camera is used to project a point from a source depth map frame onto a destination point in a current depth map frame and the projective data association process comprises searching for candidate corresponding points around the destination point.

9. A method as claimed in claim 8 wherein searching for candidate corresponding points comprises taking into account surface normals of the points.

10. A method as claimed in claim 1 wherein optimizing the error metric comprises optimizing a point-to-plane error metric that metric comprising a sum of squared distances from a source point to a plane which contains a destination point and which is oriented approximately perpendicular to a surface normal of the destination point.

11. A method as claimed in claim 1 wherein identifying corresponding points comprises extracting planes from the depth map frames.

12. A method as claimed in claim 1 wherein computing the registration parameters comprises, for each depth map frame, calculating a surface normal for each point and forming a histogram with a plurality of bins for different ranges of surface normal values, and taking a uniform sampling of points across the bins; and computing the registration parameters using only points from the uniform sampling of points.

13. A real-time camera tracker comprising:
an input arranged to receive a sequence of depth map frames from a moving mobile depth camera each depth map frame comprising a depth value at each image element that depth value being related to a distance from the mobile depth camera to a surface in the scene captured by the mobile depth camera;
a frame alignment engine arranged to track the position and orientation of the mobile depth camera by computing registration parameters for each depth map frame, those registration parameters being parameters of a transformation for aligning each depth map frame and a preceding depth map frame;
the frame alignment engine being arranged to compute the registration parameters using an iterative process to: identify corresponding points in pairs of depth map frames without computing shapes depicted within the depth map frames;
the frame alignment engine comprising a parallel computing unit arranged to optimize an error metric applied to the identified corresponding points as part of the iterative process such that the error metric is applied to each of the identified corresponding points in parallel at the parallel computing unit.

14. A real-time camera tracker as claimed in claim 13 wherein the graphics processing unit is arranged to optimize the error metric by, for each pair of corresponding points, forming a linear system for a numerical least squares optimization and reducing that linear system to a single 6 by 6 matrix.

15. A real-time camera tracker as claimed in claim 14 wherein the frame alignment engine comprises a central processing unit (CPU) and where the parallel computing unit is arranged to pass the 6 by 6 matrix to the CPU to be solved.

16. A real-time camera tracker as claimed in claim 14 wherein the graphics processing unit stores a dense 3D model of a scene captured by the mobile depth camera and wherein the frame alignment engine is arranged to estimate the preceding depth map frame from the dense 3D model.

17. A method of real-time camera tracking comprising:
receiving a sequence of depth map frames from a moving mobile depth camera each depth map frame comprising a depth value at each image element that depth value being related to a distance from the mobile depth camera to a surface in the scene captured by the mobile depth camera;
tracking the position and orientation of the mobile depth camera by computing registration parameters for each depth map frame, those registration parameters being parameters of a transformation for aligning each depth map frame and a preceding depth map frame, the preceding depth map frame being estimated from a dense 3D model of the scene;
wherein computing the registration parameters comprises using an iterative process to: identify corresponding points in pairs of depth map frames without computing shapes depicted within the depth map frames and by using a parallel computing unit to optimize an error metric applied to each of the identified corresponding points in parallel at the parallel computing unit.

18. A method as claimed in claim 17 wherein using the parallel computing unit to optimize an error metric comprises, for each pair of corresponding points, forming a linear system for a numerical least squares optimization and reducing that linear system to a single 6 by 6 matrix at the parallel computing unit.

19. A method as claimed in claim 18 which comprises calculating a weight related to the measurement characteristics of the depth camera for each of the corresponding points and using the weights during the process of applying the error metric to the corresponding points.

20. A game system comprising a mobile infra-red time-of-flight depth camera that uses structured light and a real-time tracker as recited in claim 14 for tracking the mobile depth camera, the mobile depth camera and the real-time tracker being arranged to operate at least 30 frames per second, the game system being arranged to influence the course of a game in relation to the tracking of the mobile depth camera.

* * * * *